3,288,216
Patented Nov. 29, 1966

3,288,216
INCREASING WELL INJECTIVITY
Marne M. Blickensderfer and Carl F. Brandner, Dallas, Tex., assignors to Mobil Oil Corporation, a corporation of New York
No Drawing. Filed July 25, 1963, Ser. No. 297,673
12 Claims. (Cl. 166—42)

This invention relates to a process for removing flow-restricting materials from a well and the adjacent formation. More particularly, it relates to a process for increasing the flow of fluids between a well and the adjacent formation.

In many cases, the flow of fluids between a well and an adjacent formation is severely hindered by the presence of flow-restricting materials. These flow-restricting materials may be considered to include water or oil based drilling muds, crude oils, salts, and water. These materials are especially deleterious in reducing the injectivity of wells penetrating such formation containing them during secondary recovery processes where, for example, waterflood, miscible flood, and ammonia or carbon dioxide injection procedures are to be utilized. By well injectivity, as the term is used herein, it is meant the rate of flow of a known viscosity fluid between a well and the adjacent formation, per unit area exposed to fluid flow and under a given pressure differential, as defined by Darcy's equation. For example, water may be injected via a well into a formation to drive the crude oil to an adjacent production well in the waterflood process. The injectivity of the well, due to the flow-restricting materials present in the formation and the well, may be so small that satisfactory rates of water injection can be obtained only by exceeding the formation breakdown pressure. Under such circumstances, the rate of water injection into the well must be reduced by utilizing some pressure which can be tolerated in the formation. Thus, the waterflood process cannot be practiced at its greatest efficiency. The other secondary recovery processes suffer the same difficulties.

In some cases, the injectivity of the well may be increased by removing the mud cake which resides on the walls of the well. Various procedures, both mechanical and chemical, have been proposed for removing the mud cake. However, these procedures are not acceptably satisfactory, as the materials which remain in the formation also need to be removed. It has been found that only by removal of the water, salts, and organic substances, including crude oil, from both the mud cake on the wall of the well and from the formation immediately adjacent the well, will a satisfactory increase in the well injectivity be obtained. The same problems and solutions thereof, as desirable with respect to the injectivity of a well, are equally applicable to the production of fluids from the formation into the well.

It is therefore an object of the present invention to provide a process for removing flow-restricting materials from a well and the adjacent formation. A further object of the present invention is to increase the flow of fluids between a well and the adjacent formation. Another object is to increase the injectivity of a well disposed in a formation obstructed by flow-restricting materials. A further object is to remove flow-restricting materials by a process which is compatible with the common secondary recovery processes such as waterflood, miscible flood, and ammonia or carbon dioxide injection procedures. Yet another object is to utilize a process for increasing fluid flows, which process leaves only the formation particles remaining. Another object is to provide a process well suited for increasing the injectivity of wells drilled with oil based muds and water based muds.

These and further objects of the present invention will become more apparent when considered in conjunction with the following detailed description and the appended claims.

The process of this invention comprises the steps of introducing through a well in immediate succession into the adjacent formation a slug of 1,1,1-trichloroethane, a slug of an aromatic hydrocarbon having a boiling point not in excess of about 500° F., and a slug of an aliphatic alcohol having not more than 4 carbon atoms. Each of the slugs has a volume sufficient to provide a continuous zone of said fluid slug across the formation.

More particularly, the first slug to be injected through the well into the formation is 1,1,1-trichloroethane, a chlorinated hydrocarbon solvent. This solvent is well suited for placing the heavy resinous components from crude oil, or other sources, into solution. Further, this solvent preserves these heavy resinous components in solution during the remainder of the process and also during any subsequent secondary recovery processes. Also, this solvent has no tendency to precipitate any of the other flow-restricting materials present in the formation or mud cake in the well. This solvent is relatively safe to handle by field personnel as a result of its low toxicity as compared to carbon tetrachloride. Further, it is not inflammable. This chlorinated hydrocarbon solvent can be miscibly displaced by the hydrocarbonous materials present in the formation, particularly the crude oil, and also with the materials utilized in the common secondary recovery processes such as water and miscible floods and ammonia or carbon dioxide injection procedures. This is of especial advantage in that the solubilized heavy resinous components can be readily displaced through the formation without precipitation or causing precipitation of the other flow-restricting materials that may be present.

A slug of an aromatic hydrocarbon solvent is injected from the well into the formation immediately following the injection of the chlorinated hydrocarbon solvent. The solvent may be any aromatic hydrocarbon having a boiling point not in excess of about 500° F. Although aromatic hydrocarbons having boiling points above 500° F. may be utilized, problems of solvent-solution solidification arise at the earth's surface, which problems can best be avoided by utilizing only the lower boiling solvents. For example, the aromatic hydrocarbons may be benzene, toluene, xylenes, ethyl benzene, etc. Mixtures of aromatic hydrocarbons may also be employed. Aromatic hydrocarbons can be obtained from petroleum distillation processing, aromatic extracts from petroleum, and aromatics derived from coal tar processing or other sources. From the mentioned group of aromatic hydrocarbons, permanently dissolving asphaltic materials in the crude oil, and from other sources. Also, toluene is highly miscible with the chlorinated hydrocarbon solvent immediately preceding it, with the solvent in the remaining step of the process and with the materials utilized in the common secondary recovery processes which may follow it. Thus, toluene may be miscibly displaced by these materials without undergoing precipitation of the solubilized asphaltic materials or causing precipitation of the other flow-restricting materials that may be present. Although certain specific aromatic hydrocarbons have been denoted, it will be obvious that a wide variety of aromatic hydrocarbons can be used. Further, it is intended that the aromatic hydrocarbons need not be pure, that is, 100 percent in aromatic ring content. It is envisioned that aromatic hydrocarbons mixed with other types of hydrocarbons may be used. Preferably, the aromatic ring content is above 75 percent and usually should not be less than 50 percent for best results.

Immediately following the slug of aromatic hydrocarbon solvent, there is injected from the well into the formation a slug of an aliphatic alcohol having not more than 4 carbon atoms. Suitable aliphatic alcohols are methyl, ethyl, the propyl, and the butyl alcohols. Higher molecular-weight alcohols do not give desirable results because of their small solubility in water. Also, they have only a small ability to dissolve salt, with or without water being present. Various mixtures of the alcohols may be used and the alcohols need not be 100 percent in alkyl carbonal content. However, it is preferred that the alcohol contains not more than a modest proportion of nonalcoholic hydrocarbonaceous material because of the reduced solubility with respect to water and salt that would occur. Obviously, the alcohol as injected should not contain enough water to seriously reduce the miscibility of the alcohol with the preceding aromatic hydrocarbon solvent. Otherwise, the miscible displacement of the aromatic hydrocarbon solvent would be reduced in efficiency. It is preferred to use methanol as the aliphatic alcohol because of its ready availability, high stability, and great miscibility with the aromatic hydrocarbon solvent that precedes it, and residual crude oil not dissolved by the previously injected solvents, and the common materials utilized in secondary recovery processes such as waterflood, miscible flood, and ammonia or carbon dioxide injection procedures. Also, it is highly effective in removing both water and salts from the mud cake in the well and from the formation.

Each of the solvents is injected via the well in at least a volume sufficient to provide a continuous zone of the solvent across the formation adjacent the well. By this means, the fluid-restricting materials can be removed from substantial and continuous portions of the well and the formation. Usually, the solvent slugs need not, at a group, traverse from the well laterally into the formation for a greater distance than of about 5 feet. It is believed that in some cases adequate results can be obtained where the formation is traversed by all of the successive slugs of solvent for a distance outward from the well into the formation of about twice the well diameter. The exact distance depends upon many criteria including the formation composition and the amounts of the flow-restricting materials present. Further, the volumes of each of the solvents need not be in excess of the volume required to dissolve substantially all the flow-restricting materials in the formation and well area desired to be cleaned. With the solvent slugs all injected into the formation subsequent fluid injections into the well can be readily obtained as the flow-restricting materials are in solution or are liquids readily displaced from the formation by fluids. This leaves only the formation particles remaining in the treated area of the formation adjacent the well. Also, if desired, fluids may be readily flowed from the formation into the well. Thus, once the solvent slugs have been injected, they can be made to traverse the formation toward or away from the well without precipitating the solubilized flow-resistant materials. This resides in the ability of the successive solvent slugs to be miscibly displaced by the next adjacent solvent slug, by the innate formation fluids in the untreated formation, and by the common materials used in secondary recovery procedures.

The rates of the solvent injection pressures are correlated to the formation conditions, particularly, the formation temperatures, so that the various solvent slugs are maintained in the liquid phase. It will be apparent that liquid phase cleansing of the formation is greatly more efficient than a vapor phase, which vapor phase may precipitate materials from the crude oil present in the formation. Such precipitates usually cannot be removed by any simple subsequent solvent treatment once they have been formed.

The use of the preceding-identified slugs of solvents in the present process is of great utility as a result of their miscible displacement characteristics. Thus, they are well adapted to remove all of the flow-restricting materials from any mud cake in the well and also the formation traversed by them. This provides for greatly increasing the fluid flow between the well and the adjacent formation.

A further advantage resides in that the density of the successive slugs decreases in the order in which they are injected from the well into the formation. Thus, in the preferred embodiment the 1,1,1-trichloroethane has the greatest density and is positioned in the bottom of the well. Next, the less dense toluene is introduced and immediately followed by the least dense methanol. Thereafter, the well may be pressured to force the slugs of solvent into the formation. Thus, there is no problem of mixing between the slugs of solvent in a well during their injection. A mixture of two or more of the solvents in a slug does not produce as good as result as the injection of successive slugs as has been described.

Where a secondary recovery process is to be utilized, the slug of aliphatic alcohol may be immediately followed by the secondary recovery material, whatever it may be. For example, water may be injected immediately behind the aliphatic alcohol slug and will miscibly displace it. However, the process of the present invention may also be applied in the treatment of air injection and hydrocarbon recovery wells utilized for in situ combustion procedures. Thus, the air injection well and the hydrocarbon production well are subjected to the present process. When all the slugs of solvent are injected into the formation the desired distance from each well, air is introduced under suitable operating pressure into the injection well forcing the solvent slugs further into the adjacent formation. This provides an annular zone about the air injection well of great permeability and fluid flow. Through this zone is injected the necessary air for the in situ combustion procedure. The air traverses the formation and displaces at least some of the solvent slugs from the adjacent formation into the production well. This provides an annular zone about the production well of great permeability and fluid flow. Thus, the present process is of great value in both increasing well injectivity and the production of fluids into wells.

From the foregoing it will be apparent that there has been described herein a process well suited to achieve all of the stated objects of the present invention. It is intended that the foregoing description be taken as illustrative and not limitative of the present invention. Further, it will be apparent to one skilled in the art that various changes may be made in the disclosed process without departing from the spirit of the invention. Such changes are intended to be encompassed within the scope of the present invention and that the only limitations to be applied are those found in the following claims.

What is claimed is:

1. A process for increasing the flow of fluids between a well and a formation obstructed by flow-restricting materials comprising the steps of introducing through the well into the formation in immediate succession a slug of 1,1,1-trichloroethane, a slug of toluene, and a slug of methanol, and each of said slugs having a volume sufficient to provide a continuous zone of said slug across the formation whereby substantial portions of the flow-restricting materials are removed from the formation and well to thereby increase the flow of fluids between the well and the formation.

2. The process of claim 1 wherein the slugs as a group have traversed laterally away from the well into the formation a distance of between twice the well diameter and about 5 feet.

3. A process for increasing the flow of fluids between a well and a formation obstructed by flow-restricting materials comprising the steps of introducing through the well into the formation in immediate succession a slug of 1,1,1-trichloroethane, a slug of an aromatic hydrocarbon having a boiling point not in excess of about 500° F., and a slug of an aliphatic alcohol having not more than four carbon atoms, and each of said slugs having a volume sufficient to provide a continuous zone of said slug across the formation whereby substantial portions of the flow-restricting materials are removed from the formation and well to thereby increase the flow of fluids between the well and the formation.

4. The process of claim 3 wherein the slugs as a group have traversed laterally away from the well into the formation a distance of between twice the well diameter and about 5 feet.

5. A process for increasing the flow of fluids between a well and a formation obstructed by flow-restricting materials comprising the steps of introducing through the well into the formation in immediate succession a slug of 1,1,1-trichloroethane, a slug of toluene, and a slug of an aliphatic alcohol having not more than 4 carbon atoms, and each of said slugs having a volume sufficient to provide a continuous zone of said slug across the formation whereby substantial portions of the flow-restricting materials are removed from the formation and well to thereby increase the flow of fluids between the well and the formation.

6. The process of claim 5 wherein the slugs as a group have traversed laterally away from the well into the formation a distance of between twice the well diameter and about 5 feet.

7. A process for increasing the flow of fluids between a well and a formation obstructed by flow-restricting materials comprising the steps of introducing through the well into the formation in immediate succession a slug of 1,1,1-trichloroethane, a slug of an aromatic hydrocarbon having a boiling point not in excess of about 500° F., and a slug of methanol, and each of said slugs having a volume sufficient to provide a continuous zone of said slug across the formation whereby substantial portions of the flow-restricting materials are removed from the formation and well to thereby increase the flow of fluids between the well and the formation.

8. The process of increasing the injectivity of a well comprising the steps of introducing through the well into the formation in immediate succession a slug of 1,1,1-trichloroethane, a slug of an aromatic hydrocarbon having a boiling point not in excess of about 500° F., and a slug of an aliphatic alcohol having not more than 4 carbon atoms, each of said slugs having a volume sufficient to provide a continuous zone of said slug across the formation, and subsequently injecting a fluid miscible with the aliphatic alcohol from the well into the formation for displacing the slugs in the formation from adjacent the well whereby the resistance to fluid flow is greatly reduced through the formation portions which have contained the slugs.

9. The process of claim 8 wherein the slugs as a group have traversed laterally away from the well into the formation a distance of between twice the well diameter and about 5 feet.

10. The process of claim 8 wherein the aromatic hydrocarbon is toluene.

11. The process of claim 8 wherein the aliphatic alcohol is methanol.

12. The process of claim 8 wherein the aromatic hydrocarbon is toluene and the aliphatic alcohol is methanol.

References Cited by the Examiner

UNITED STATES PATENTS

| 1,948,045 | 2/1934 | Parkhurst | 252—8.55 X |
| 2,830,018 | 4/1958 | Thompson et al. | 166—42 X |
| 3,131,759 | 5/1964 | Slusser et al. | |

CHARLES E. O'CONNELL, *Primary Examiner.*

T. A. ZALENSKI, *Examiner.*

J. A. LEPPINK, *Assistant Examiner.*

UNITED STATES PATENT OFFICE
CERTIFICATE OF CORRECTION

Patent No. 3,288,216                              November 29, 1966

Marne M. Blickensderfer et al.

It is hereby certified that error appears in the above numbered patent requiring correction and that the said Letters Patent should read as corrected below.

Column 2, line 53, after "hydrocarbons," insert -- toluene is preferred because of its great facility for the --; column 3, line 6, for "small" read -- smaller --; line 22, for "and" read -- any --; line 34, for "at" read -- as --; column 4, line 16, for "as", second occurrence, read -- a --.

Signed and sealed this 12th day of September 1967.

(SEAL)
Attest:

ERNEST W. SWIDER                              EDWARD J. BRENNER
Attesting Officer                                     Commissioner of Patents